United States Patent [19]

Lay

[11] Patent Number: 4,778,047

[45] Date of Patent: Oct. 18, 1988

[54] LASER DISC STORAGE CONTAINER

[76] Inventor: Ding T. Lay, No. 147, Ming Chuan Road, Hsing Tien City, Taipei County, Taiwan

[21] Appl. No.: 95,026

[22] Filed: Sep. 10, 1987

[51] Int. Cl.4 ............................................. B65D 85/57
[52] U.S. Cl. ............................... 206/44 B; 206/309; 206/311; 206/425
[58] Field of Search ............... 206/307, 309, 311, 425, 206/444, 44 B; 211/40, 169, 169.1; 312/10, 13

[56] References Cited

U.S. PATENT DOCUMENTS

| 821,019 | 5/1906 | Cooke, Jr. | 206/425 |
| 1,186,312 | 6/1916 | Hanselmann | 206/311 |
| 1,459,457 | 6/1923 | Wilburger | 206/311 |
| 2,463,450 | 3/1949 | Wisner | 206/311 |
| 4,538,730 | 9/1985 | Wu | 206/44 B |

FOREIGN PATENT DOCUMENTS

| 0132812 | 4/1929 | Fed. Rep. of Germany | 206/311 |
| 0022973 | 6/1948 | Finland | 211/40 |
| 0642651 | 9/1928 | France | 206/311 |
| 1194784 | 11/1959 | France | 206/311 |
| 0125897 | 5/1919 | United Kingdom | 206/311 |

Primary Examiner—Jimmy G. Foster
Attorney, Agent, or Firm—Morton J. Rosenberg

[57] ABSTRACT

The subject invention provides an improved structure for a laser disc storage container (10) which allows for laser discs contained within container (10) to be easily displayed, removed and inserted with a minimum of effort, while simultaneously maintaining a minimum volume for the container (10). The overall concept is directed to disc envelopes (30) being fixedly secured to spring member appendages (22) of spring mechanisms (20). The spring member appendages (22) are biased at individual angles to a spring base portion (24) to allow individual disc envelopes (30) to be rotated to individual display angles when the container (10) is opened.

2 Claims, 2 Drawing Sheets

4,778,047

LASER DISC STORAGE CONTAINER

BACKGROUND OF THE INVENTION

This invention relates to an improved structure for a laser disc storage container, and especially to a miniaturized and more convenient laser disc storage container.

Conventional laser disc containers are generally large in size and many of them are only available for one laser disc containment. Being of a large volume, such laser disc containers are not easy to carry.

One prior art storage container as is shown in FIG. 1 provides for an echelon and overlapping arrangement for disc envelopes and does provides for a plurality of discs to be maintained in one container. However, since such prior art containers are in echelon contour as well as an overlapping arrangement, the overall length of the container has to be lengthened in order to accomodate a plurality of discs. Additionally, the user has to turn over the discs when the user wishes to remove a particular laser disc.

In light of the problems associated with the prior art laser disc containers, the subject system provides for a disc storage container having a small volume which allows the laser discs to display themselves automatically when the user opens the container.

One of the main objects of the subject invention concept is to provide an improved structure for laser disc containers with a minimum of volume and ease in selection of a predetermined disc.

Another object of the invention concept is to provide an improved structure for laser disc containers to save unit space for disc storage while minimizing the material used and the overall manufacturing cost.

DETAILED DESCRIPTION OF THE PREFERRED EMBODIMENT

Figure 1:
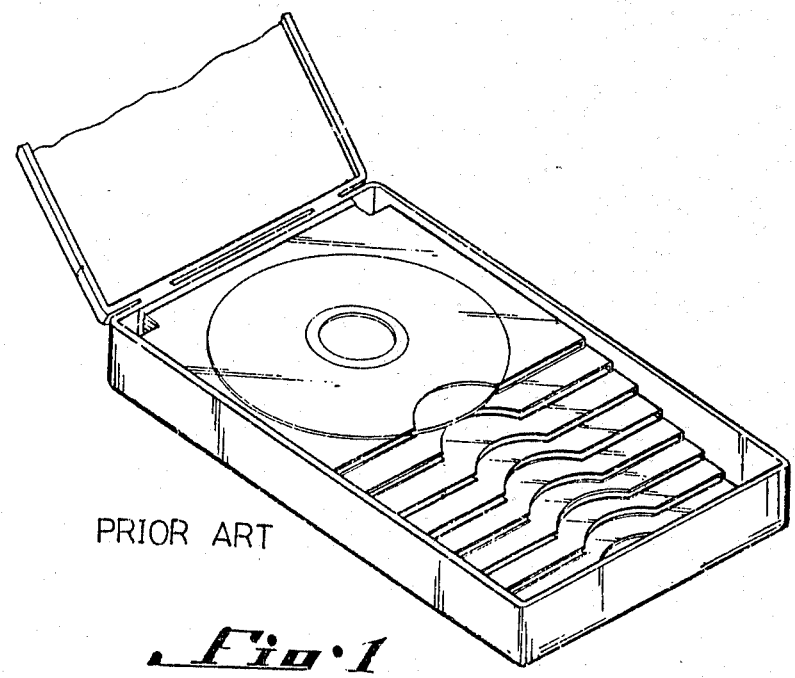
FIG. 1 is the schematic view of the conventional laser disc storage container displaying in three dimensions.
Figure 2:
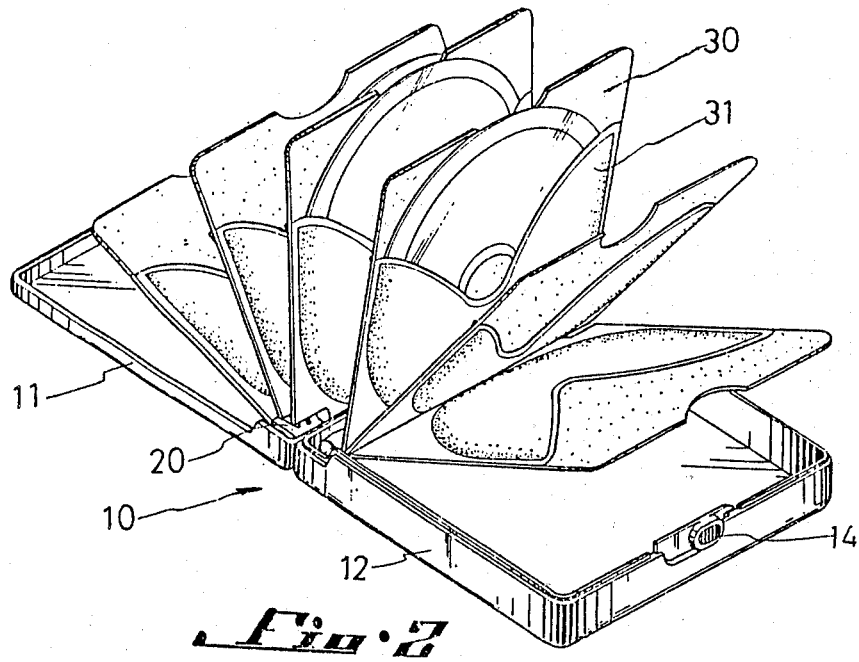
FIG. 2 is a better example of the fragmentary schematic view of this invention in three dimensions.

Referring now to FIG. 1, there is shown a schematic view of a conventional laser disc storage container showing a plurality of disc pockets having laser discs inserted therein. Referring now to FIG. 2, there is shown a fragmentary schematic view of the subject improved laser disc storage container in partially exploded view. The improved laser disc storage container of the subject invention includes container body 10 having upper shell member 11 and lower shell member 12 hingedly coupled at a rear section with conventional hinge latches 13. Upper and lower shell members 11 and 12 further include fastening mechanism 14 which may be a standard slide switch as is clearly shown. Fastening mechanism 14 is secured to a frontal portion of upper and lower shell members 11 and 12 for securing both upper and lower shell members 11 and 12 each to the other. In this manner, container body 10 may be opened and closed.

Figure 3:
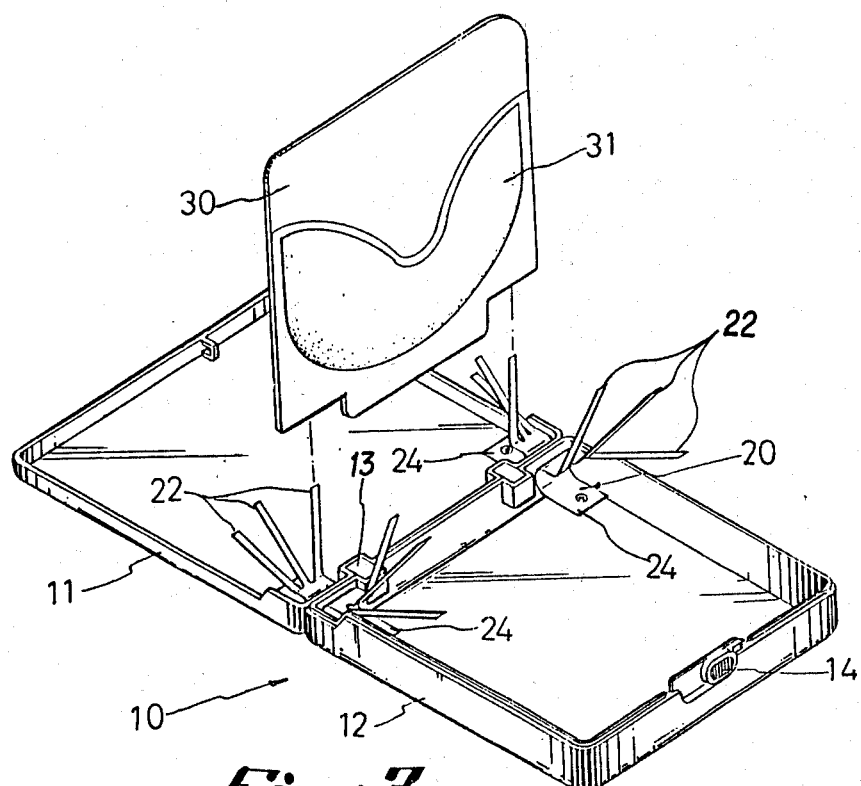
FIG. 3 is a better example of the schematic view of this invention displaying in three dimensions.

Four spring mechanisms 20 each being in the form of a C-shaped leaf spring are provided as is shown in FIG. 3. Each of spring mechanisms 20 include a base portion 24 which is secured or fixed to a wall member of one of the corresponding upper shell member 11 or lower shell member 12. As can be seen, base portion 24 of spring mechanism 20 is secured to a respective shell wall member in the vicinity or neighborhood of latches 13.

As can be seen in FIG. 3, each of spring mechanisms 20 further include a plurality of spring member appendages 22 which are biased at individual angles to spring base portion 24. The plurality of spring member appendages 22 define a fan shaped envelope. Spring mechanism 20 including both base portion 24 and spring appendages 22 may be formed unitarily. Thus, as is seen in FIG. 3, spring appendages 22 provide for a spread frame upon which disc envelopes 30 may be attached as will be defined in following paragraphs.

As is seen in FIGS. 2 and 3, a plurality of disc envelopes 30 include bottom surfaces which may be affixed to individual spring member appendages 22 through any well known technique.

Each of disc envelopes 30 include disc pockets 31 which may be formed on opposing surfaces of each of disc envelopes 30. Additionally, the uppermost and lowermost disc envelopes 30 may include only one disc pocket 31. Where disc pockets 31 are formed on opposing surfaces of disc envelopes 30, the storage of the laser discs contained therein may be increased.

Disc pockets 31 may include arcuate openings in order to facilitate the insertion and removal of discs as well as to facilitate the display of the discs contained therein.

Figure 4:
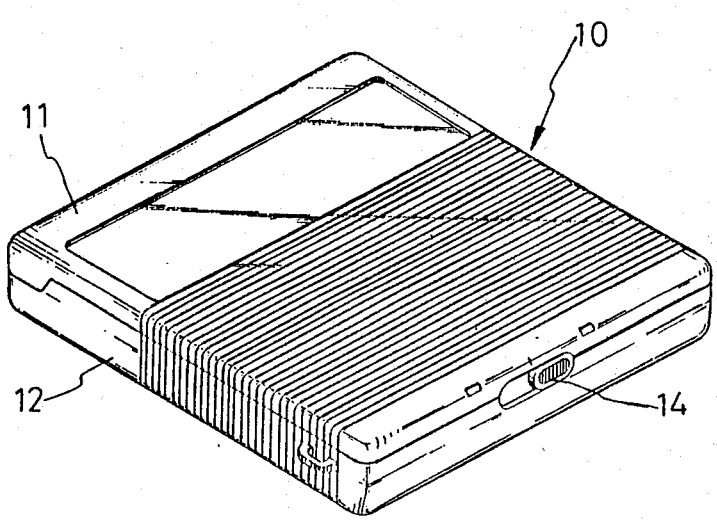
FIG. 4 is a better example of the outer schematic view of this invention in three dimensions.

In operation, with the container body 10 in a closed position as shown in FIG. 4, fastening mechanism or switch 14 may be displaced to allow rotative displacement of upper shell member 11 with respect to lower shell member 12 providing for an opening of container body 10. Disc envelopes 30 being secured to laterally aligned spring member appendages 22 are thus rotated through the bias of spring member appendages 22 into individual differing angles. In this manner, the user may easily see the proper disc in order to remove such for use.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

I claim:

1. A laser disc storage container comprising:
    (a) a container body having an upper shell member and a lower shell member hingedly coupled each to the other by a pair of latch members, said upper and lower shell member having a cooperating fastening means secured to frontal portions thereof for securing said upper and lower shell member each to the other;
    (b) leaf spring means secured to a wall member of said upper or lower shell member, said leaf spring means including a base portion secured to said wall member and a plurality of spring member appendages biased at individual angles to said spring base portion, said plurality of spring member appendages defining a fan shaped envelope; and, (c) a plurality of disc envelopes, each of said disc envelopes having a bottom wall fixedly secured to an individual one of said spring member appendages, whereby when said upper and lower shell members are displaced from each other said disc envelopes are rotatively displaced to differing angular inclinations for facilitating insertion and removal of discs into and out of said said disc envelopes.

2. The laser disc storage container as recited in claim 1 where said disc envelopes include at least one disc pocket member having an arcuately contoured opening for ease of viewing a disc contained therein.

* * * * *